US012705593B2

(12) United States Patent
Albert et al.

(10) Patent No.: US 12,705,593 B2
(45) Date of Patent: Aug. 11, 2026

(54) MOBILITY TELLER SYSTEM AND METHOD AND QR CODE TRANSACTION ACTIVATION

(71) Applicant: Glory Ltd., Himeji (JP)

(72) Inventors: Stefan Albert, Frankfurt (DE); Frank Nentwich, Frankfurt (DE); Ana Constantino, Torres Vedras (PT)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 18/740,758

(22) Filed: Jun. 12, 2024

(65) Prior Publication Data

US 2025/0200540 A1 Jun. 19, 2025

Related U.S. Application Data

(60) Provisional application No. 63/611,264, filed on Dec. 18, 2023.

(51) Int. Cl.

*G06Q 20/10* (2012.01)
*G06K 7/14* (2006.01)

(52) U.S. Cl.

CPC ....... *G06Q 20/1085* (2013.01); *G06K 7/1417* (2013.01)

(58) Field of Classification Search

CPC ........................ G06Q 20/1085; G06K 7/1417
USPC .......................................................... 705/43
See application file for complete search history.

(56) References Cited

U.S. PATENT DOCUMENTS 10,475,296 B1 * 11/2019 Soprano-Joseph ...... G07G 1/12
2022/0180363 A1 * 6/2022 Mattison, Sr. ........ G07F 19/203

* cited by examiner

*Primary Examiner* — Ambreen A. Alladin
(74) *Attorney, Agent, or Firm* — XSENSUS LLP

(57) ABSTRACT

A money teller system in accordance with the present disclosure includes a money device and a teller device. The money device includes a body having a quick response (QR) code. The teller device includes a scanner and processing circuitry. The processing circuitry configured to generate a transaction with respect to an account; control the scanner to scan the QR code of the money device; pair the teller device and money device; and instruct the money device to process the transaction.

20 Claims, 14 Drawing Sheets

Interface

Transactions
Withdrawal
Exchange
Log in/out
Deposit
Transfer
Vault Buy
Vault Sell
Device Status

Figure 7B:
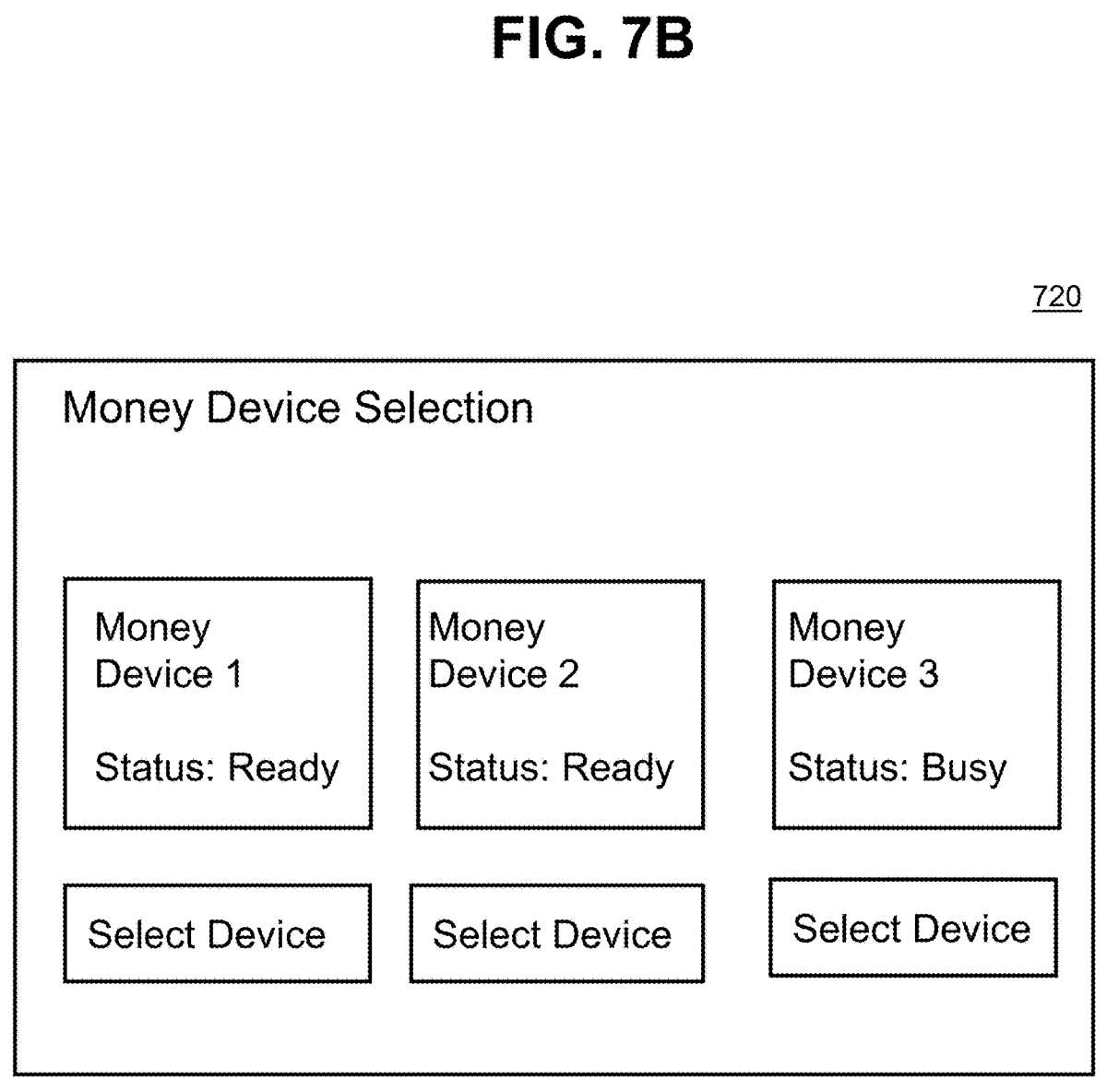

Money Device Selection

Money Device 1

Status: Ready

Money Device 2

Status: Ready

Money Device 3

Status: Busy

Select Device

Select Device

Select Device

Money Device Status

Inventory

Load

Empty

Money Device Transaction History

| Day/Time | Transaction Type | Transaction Amount | Remaining Balance | Action |
|---|---|---|---|---|
| 1/17/2024 2:54 PM | Withdrawal | $250 | $1750 | Details |
| 1/17/2024 2:57 PM | Deposit Check | N/A | $1750 | Details |
| 1/17/2024 3:01 PM | Load Device | $1000 | $2750 | Details |
| 1/17/2024 3:06 PM | Withdrawal | $200 | $2550 | Details |
| 1/17/2024 3:23 PM | Exchange | $100 dep $100 withdr | $2250 | Details |

Deposit Screen

| Denomination | Count | Amount |
|---|---|---|
| $100.00 | 2 | $200.00 |
| $50.00 | 1 | $50.00 |
| $20.00 | 0 | $0.00 |
| $10.00 | 3 | $30.00 |
| $5.00 | 0 | $0.00 |
| Deposit Amount: | | $280.00 |

Withdrawal Screen

| Denomination | Count | Amount |
| --- | --- | --- |
| $100.00 | 0 | $0.00 |
| $50.00 | 4 | $200.00 |
| $20.00 | 4 | $80.00 |
| $10.00 | 0 | $0.00 |
| $5.00 | 0 | $0.00 |
| Dispensed Amount: | | $280.00 |

Figure 7G:
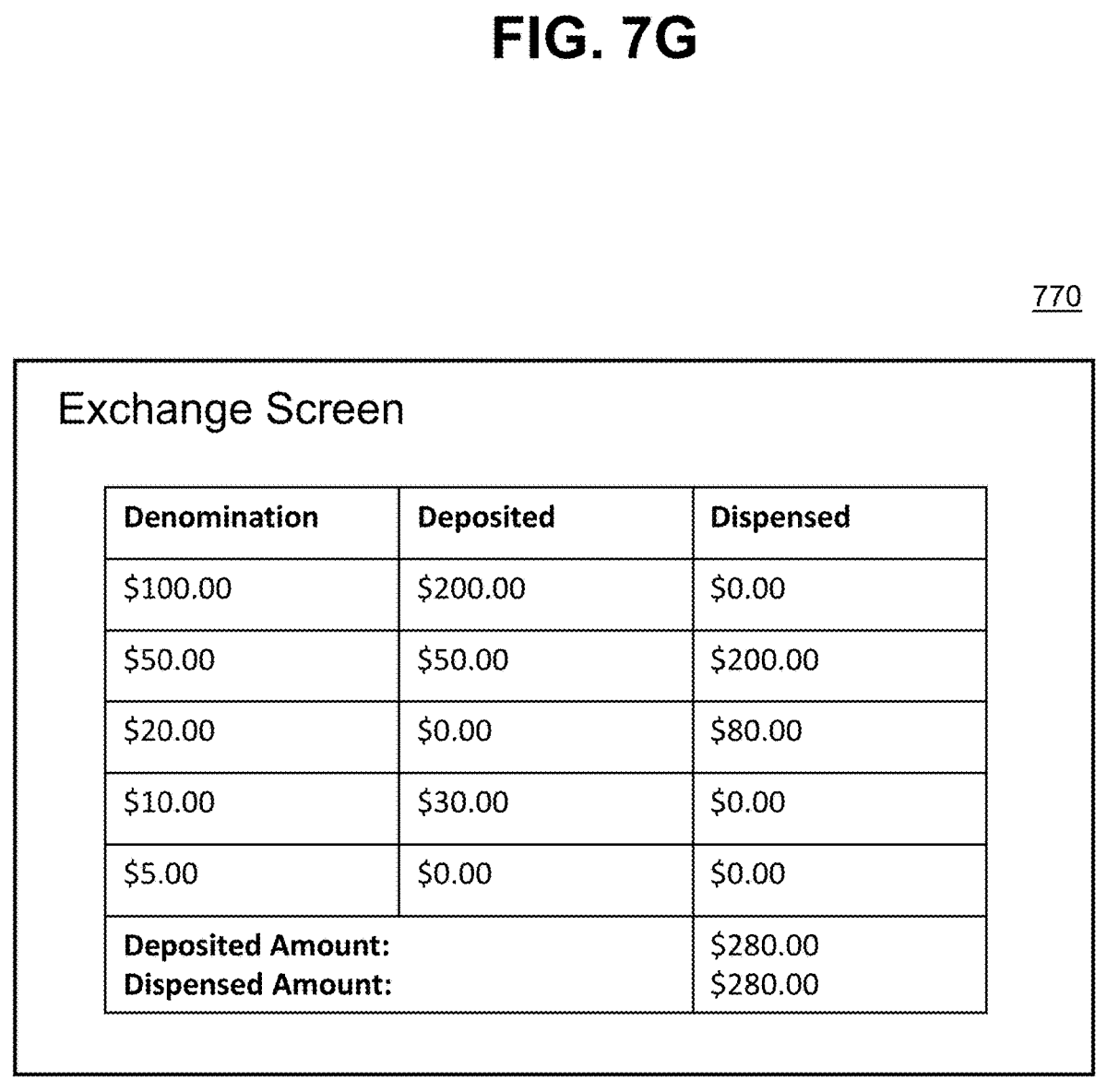

Exchange Screen

| Denomination | Deposited | Dispensed |
|---|---|---|
| $100.00 | $200.00 | $0.00 |
| $50.00 | $50.00 | $200.00 |
| $20.00 | $0.00 | $80.00 |
| $10.00 | $30.00 | $0.00 |
| $5.00 | $0.00 | $0.00 |
| **Deposited Amount:**<br>**Dispensed Amount:** | | $280.00<br>$280.00 |

800

MOBILITY TELLER SYSTEM AND METHOD AND QR CODE TRANSACTION ACTIVATION

CROSS-REFERENCE TO RELATED APPLICATION

The present application claims priority to U.S. provisional patent application No. 63/611,264, filed Dec. 18, 2023, the entire contents of which is incorporated herein by reference.

BACKGROUND

Conventionally, a bank teller provides financial processing from behind a counter. The teller receives requests from a customer, such as withdrawals from the customer's account, and hands money over the counter to the customer.

In recent years, the role of a bank teller has expanded and changed, with varied responsibilities. And while it is possible to interact with an automated teller machine (ATM), many customers prefer to interact with a bank teller to complete the transaction. So, it may be needed for the bank teller to work behind the counter as well as in front of the counter to perform other responsibilities.

SUMMARY

In an exemplary implementation of the present disclosure, a money teller system includes a money device and a teller device. The money device includes a body having a quick response (QR) code. The teller device includes a scanner and processing circuitry. The processing circuitry configured to generate a transaction with respect to an account; control the scanner to scan the QR code of the money device; pair the teller device and money device; and instruct the money device to process the transaction.

In another exemplary implementation of the present disclosure, a teller device includes processing circuitry configured to generate a transaction with respect to an account; control a scanner to scan a QR code of a money device; pair the transaction device and money device; and instruct the money device to process the transaction.

In another exemplary implementation of the present disclosure, a transaction method comprises generating, by a first device including processing circuitry, a transaction with respect to an account; scanning, by the first device, a QR code of a second device; pairing the first device with the second device; and instruct, by the first device, the second device to process the transaction.

BRIEF DESCRIPTION OF THE DRAWINGS

FIG. 7A illustrates a block diagram of an exemplary display interface screen of a teller device in accordance with the present disclosure.

FIG. 7B illustrates a block diagram of an exemplary money device selection screen of the teller device in accordance with the present disclosure.

FIG. 7C illustrates a block diagram of an exemplary money device status screen of the teller device in accordance with the present disclosure.

FIG. 7D illustrates a block diagram of an exemplary money device transaction history screen of the teller device in accordance with the present disclosure.

FIG. 7E illustrates a block diagram of an exemplary deposit screen of the teller device in accordance with the present disclosure.

FIG. 7F illustrates a block diagram of an exemplary withdrawal screen of the teller device in accordance with the present disclosure.

FIG. 7G illustrates a block diagram of an exemplary exchange screen of the teller device in accordance with the present disclosure.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation. Furthermore, as used herein the terms "circuit" or "circuitry" means one or more circuits, including discrete circuit(s) as well as circuit board(s) and combinations thereof.

The various elements, features, and processes described herein may be used independently of one another or may be combined in various ways. All possible combinations and sub-combinations are intended to fall within the scope of this disclosure.

Figure 8:
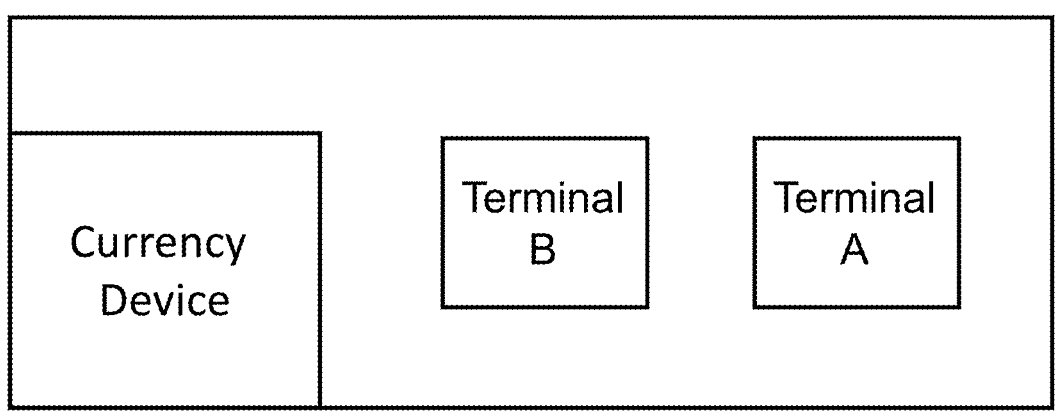
FIG. 8 illustrates a traditional cash teller platform.

Moving onto discussion of the drawings, FIG. 8 illustrates a traditional cash teller platform. Core teller platform 800 may include terminal A, terminal B and a cash device such as teller cash recycler (TCR) or other infrastructure for deposit, withdrawal, exchange and other transactions.

Terminal A operates a traditional bank teller application, which may be network connected to a bank server which manages customer account information. Terminal B operates as a Cash Insight Assure (CIA) system or other local transaction management application system.

Terminal B may be connected to the TCR, but the CIA system is not online. A teller uses the CIA system of terminal B to control TCR or other teller automation devices and to input information needed to reconcile the TCR with the bank's teller application.

In the traditional cash teller platform 800, a teller must operate both terminals A and B. To facilitate a transaction, the teller must enter data into the bank teller application on terminal A, as well as enter the data into the CIA system of terminal B.

Terminal A and terminal B are not connected or integrated. Rather, terminals A and B function in a complementary fashion. The traditional cash teller platform works as follows: Withdrawal transaction: when the teller receives a withdrawal request from a customer, the teller uses the bank application of terminal A to access the customer's bank account to verify that the customer's bank account has a withdrawal balance. If there is a withdrawal balance, the teller subtracts the amount of the withdrawal and updates the customer's bank account via the bank application of terminal A. The teller then enters the withdrawal transaction into the CIA system of terminal B to initiate a withdrawal of withdrawal amount from the TCR.

Deposit transaction: when the teller receives a deposit request from the customer, the teller uses the CIA system of terminal B to enter a deposit transaction. The teller then processes received cash with the TCR, and obtains information about a deposit amount. The Teller then uses the bank account of Terminal A to access the customer's bank account and updates the customer's bank account by adding the deposit amount to the customer's bank account.

The inventors of the present disclosure have recognized limitations in traditional teller operations and bank and/or credit union configurations. The inventors of the present disclosure propose conversion of a lobby layout from a counter format, in which a teller traditionally sits behind the counter to perform transaction operations with a system such as core teller platform 800, to an island format in which a device utilizing the banking application, the TCR and CIA systems may be utilized. A "CIA-touch" system may be utilized so that the traditional teller instead operates as a universal banker to interact with users (also referred to as customers), and can enable additional sales with the introduction of financial products such as investments.

Figure 1:
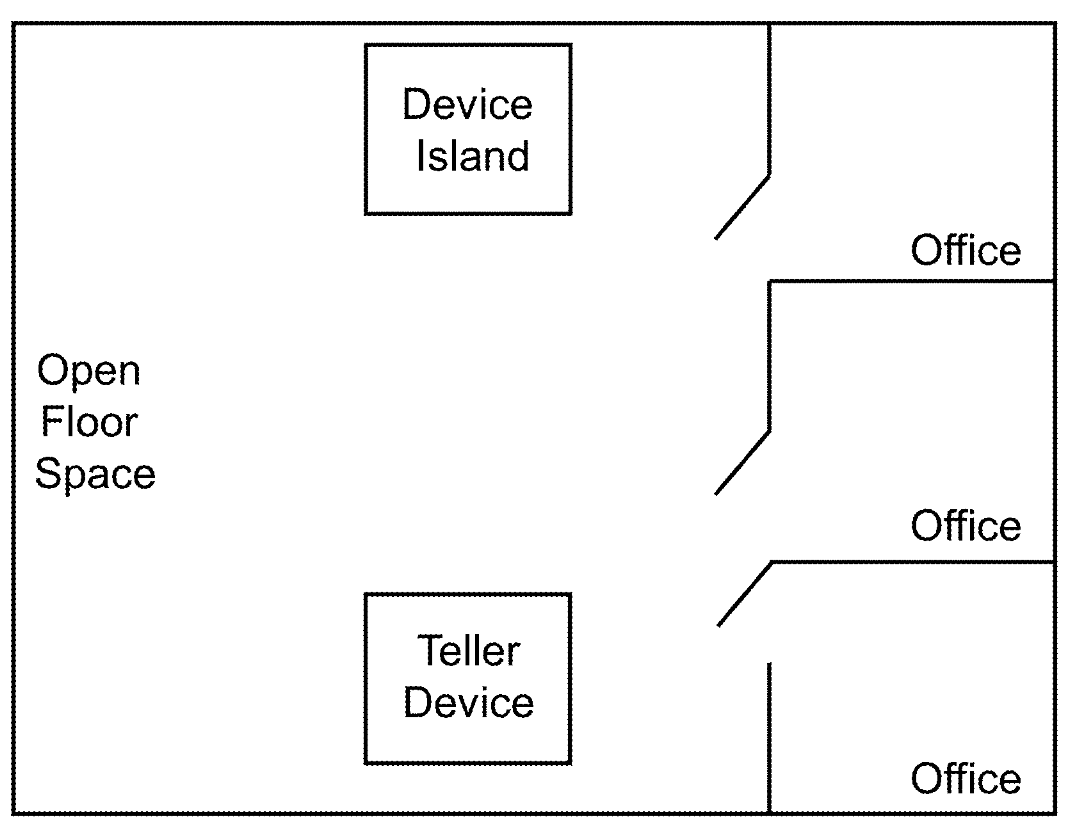
FIG. 1 is a schematic of an exemplary layout of a floor space in accordance with the present disclosure.

FIG. 1 is a schematic of an exemplary layout of a floor space 1. In accordance with the present disclosure, a teller device is operated by a teller. The teller may move around the floor space 1 to interact with customers. Floor space 1 includes an open floor space which is an open area that is configurable, and floor space 1 may include offices if needed. One or more device islands are located in floor space 1 and, preferably, in an easy to access area of floor space 1 such as in the open floor area. The one or more device islands each include one or more money devices, and each device on each device island is easily accessible and may be selected by a teller with teller device. In an exemplary implementation, plural tellers each with a teller device may interact with a money device in a device island, one at a time, or the plural tellers may each individually interact with a different money device in a device island.

In contrast to conventional bank layouts in which a money device is behind a counter operated by a teller, each device island is located in the open floor space which is easy to access and which allows a teller with teller device to interact with customers throughout floor space 1.

It is noted that the scope of the present disclosure is not limited to banks, tellers, money devices and associated devices. While discussion may relate to a configuration of a bank floorspace, teller device and a money device, the invention of present disclosure is not limited to such. The bank may be any office, store, or other location, the teller may be a person who uses the teller device to facilitate the transaction, and a customer may be any user or person requesting a transaction. The teller device may be a device used to facilitate transactions and the money device may be a device which completes the transaction (such as deposit, withdrawal and exchange). Additional details of a teller device and a money device will be described later.

Figure 2:
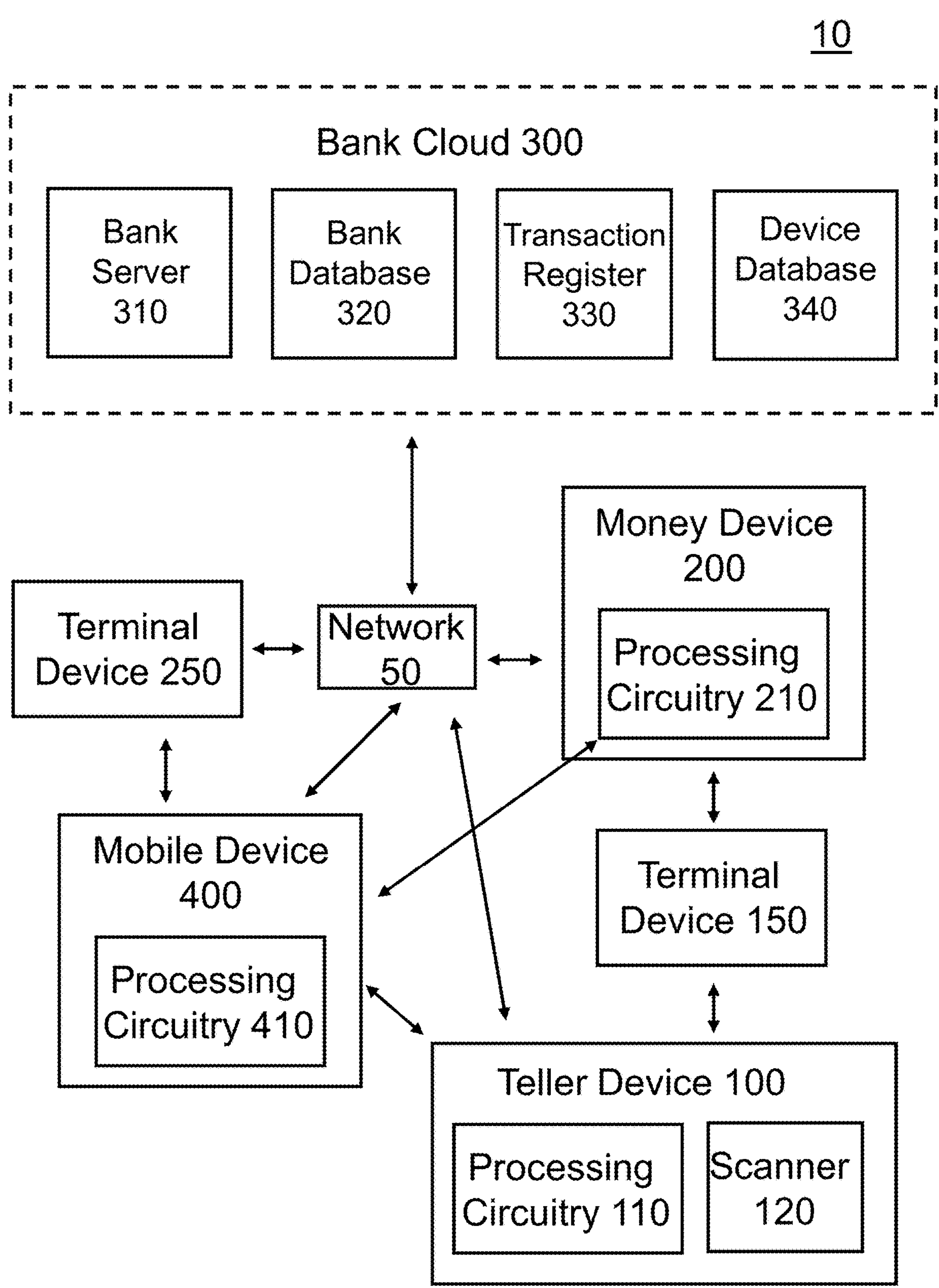
FIG. 2 is a block diagram of a system in accordance with the present disclosure.

FIG. 2 is a block diagram of a system in accordance with the present disclosure. FIG. 2 illustrates system 10, in which teller device 100 interacts with money device 200. In an exemplary implementation, money device 200 is a TCR or other infrastructure for deposit, withdrawal, exchange and other transactions.

In some implementations, system 10 may include plural teller devices 100 and/or may include plural money devices 200. In some implementations, system 10 may further include a terminal device 150 and/or one or more terminal devices 250. In particular, system 10 may include one or more device islands, and each device island may include one or more money devices 200 and may include a terminal device 250.

In some implementations, teller device 100 and/or money device 200 may interact with bank cloud 300 via network 50. In some implementations, mobile device 400 may interact with teller device 100, money device 200 and/or bank cloud 300. In an exemplary implementation, teller device 100 includes processing circuitry 110 and scanner 120, money device 200 includes processing circuitry 210, and mobile device 400 includes processing circuitry 410. Additional details of teller device 100, money device 200 mobile device 400 and their associated processing circuitry 110/210/410 will be provided later with respect to FIGS. 3 and 4.

In an exemplary implementation, bank cloud 300 is a central bank system for managing all customer accounts and transactions. Bank cloud 300 may include bank server 310, bank database 320, transaction register 330 and device database 340. Functionality of bank server 310, bank database 320, transaction register 330 and device database 340 will be discussed later.

In an exemplary implementation, teller device 100 is a smartphone, touchscreen tablet or portable computer used by a teller. Terminal device 150 operates as a CIA system and teller device 100 communicates with terminal device 150. The CIA system controls operations of money device 200. In an exemplary communication, teller device 100 communicates with terminal device 150 to process a transaction, and CIA system communicates with money device 200 to process the transaction.

In other implementations, teller device 100 operates as the CIA system. In such implementations, teller device 100 may communicate directly with money device 200 or teller device 100 may communicate with money device 200 via network 50. In other implementations, teller device 100 does not communicate with money device 200; rather, teller device 100 communicates with bank cloud 300 and bank cloud 300 communicates with money device 200.

Terminal device 250 may be installed at various locations in floor space 1. In some implementations, a terminal device 250 may be installed in a device island along with money device 200. Terminal device 250 operates a bank application. After account information is received by the teller from a customer, the teller inputs information into the bank application via terminal device 250. Terminal device 250 communicates with bank cloud 300 to verify account information, process a completed transaction and/or update a customer bank account information.

In some implementations, teller device 100 may operate the bank application, in which the teller inputs information into the bank application via teller device 100. Then, teller device 100 communicates with bank cloud 300 to verify account information, enter a completed transaction and/or update a customer bank account information.

An exemplary process of the present disclosure is as follows:

1. A transaction is requested by a customer to a teller. The teller logs into teller device 100.
2. The transaction is queued into the teller device 100.
3. The teller device 100 scans a quick response (QR) code of money device 200 to pair teller device 100 with money device 200.
4. The transaction queued with teller device 100 is executed by money device 200.

In an exemplary implementation, the above steps 1-4 may be performed by teller device 100 and money device 200 without an active connection to bank cloud 300. That is, teller device 100 and money device 200 may operate "offline", alongside and not reliant upon a bank's core system such as bank cloud 300. Instead of utilizing bank core systems, a teller queues a transaction into teller device 100 and the teller device 100 scans a QR code of money device 200. Then, teller device 100 communicates with the CIA system of terminal device 150 to control money device 200 to execute the queued transaction. By the teller going to the money device 200 and scanning the QR code attached to the money device 200 with teller device 100, the teller device 100 may be connected to the money device 200 via the CIA system, and the queued transaction is then sent to the money device 200 via the CIA system and the transaction is then processed by the money device 200.

In another implementation, the teller device 100 operates as the CIA system and controls the money device 200 to execute the queued transaction. A teller uses teller device 100 to launches an application for the CIA system to queue a transaction, and the teller device 100 scans a QR code of money device 200. Then, teller device 100 uses the CIA system to send the queued transaction to the money device 200 and the transaction is then processed by the money device 200.

Later, the completed transactions may be synchronized and reconciled between the CIA system and bank cloud 300. Such features provide functionality that is complementary to current banking core system functionality and allows for simple integration into existing systems and structures.

In some implementations, the teller using teller device 100 may select the money device 200 via a display screen of money device 200, and confirmation of the selected device may be performed via the display screen, via device to device communication with money device 200, or via scanning of the QR code of the money device 200.

Later, such as at the end of the day (but this can be performed at another interval), transactions performed by money device 200 may be synchronized with bank cloud 300.

Further details of the process will be provided later with respect to FIGS. 5 and 6.

In some implementations, mobile device 400 may be used by a customer/user to provide account and/or transaction information to teller device 100 or terminal device 250. For example, when a customer requests the teller to perform a transaction, the customer may use their mobile device 400 to provide account information directly to teller device 100, directly to terminal device 250 or via network 50 and/or bank cloud 300.

The mobile device 400 may be utilized to authenticate the user with biometrics. For example, mobile device 400 may prompt the user to input biometric information, such as a thumbprint or other fingerprint, a face scan, eye scan, voice comparison or other biometric verification, and such biometric information may be input to mobile device 400. In other implementations, the mobile device 400 prompts the user to input another security verifier, such as a passcode, pin or password. In other implementations, money device 400 may communicate directly with money device 200, directly with terminal device 150 or via network 50 and/or bank cloud 300 to facilitate the transaction.

Figure 3:
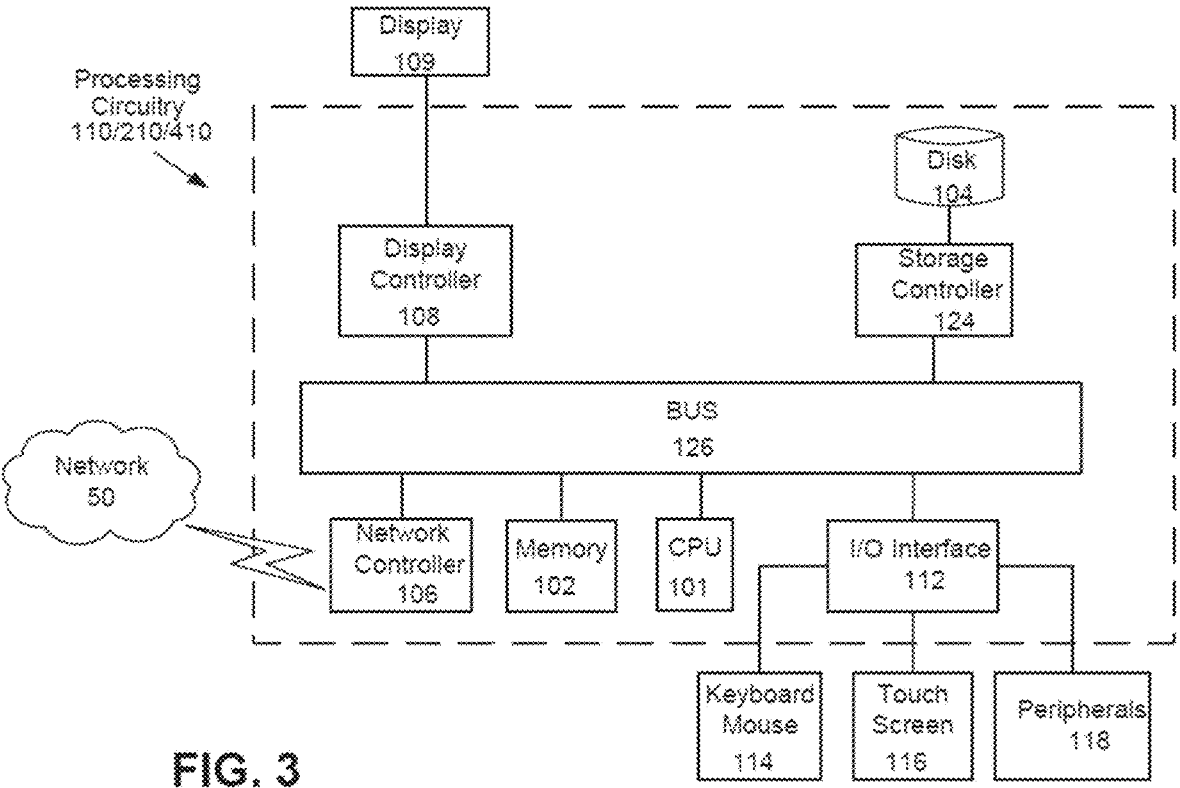
FIG. 3 is a block diagram of processing circuitry that performs computer-based operations in accordance with the present disclosure.

FIG. 3 is a block diagram of processing circuitry that performs computer-based operations in accordance with the present disclosure. FIG. 3 illustrates processing circuitry 110 of teller device 100. Additionally, discussion of processing circuitry with respect to FIG. 3 also corresponds to processing circuitry 210 of money device 200 and processing circuitry 410 of mobile device 400.

Processing circuitry 110/210/410 is used to control any computer-based and cloud-based control processes, descriptions or blocks in flowcharts can be understood as representing modules, segments or portions of code which include one or more executable instructions for implementing specific logical functions or steps in the process, and alternate implementations are included within the scope of the exemplary embodiments of the present disclosure. The functionality of the elements disclosed herein may be implemented using circuitry or processing circuitry which includes general purpose processors, special purpose processors, integrated circuits, ASICs ("Application Specific Integrated Circuits"), CPU (a Central Processing Unit), FPGAs ("Field-Programmable Gate Arrays"), conventional circuitry and/or combinations thereof which are configured or programmed to perform the disclosed functionality. Processors are considered processing circuitry or circuitry as they include transistors and other circuitry therein. Processors may be a programmed processor which may execute programs stored in a memory. In the disclosure, the circuitry, units, or means are hardware that carry out or are programmed to perform the recited functionality. The hardware may be any hardware disclosed herein which is programmed or configured to carry out the recited functionality.

In FIG. 3, the processing circuitry 110/210/410 includes a CPU 101 which performs one or more of the control processes discussed in this disclosure. The process data and instructions may be stored in memory 102. These processes and instructions may also be stored on a storage medium disk 104 such as a hard drive (HDD) or portable storage medium or may be stored remotely. Further, the present disclosure is not limited by the form of the computer-readable media on which the instructions of the inventive process are stored. For example, the instructions may be stored on CDs, DVDs, in FLASH memory, RAM, ROM, PROM, EPROM, EEPROM, hard disk or any other non-transitory computer readable medium of an information processing device with which the processing circuitry 110/210/410 communicates, such as a server or computer. The processes may also be stored in network based storage, cloud-based storage or other mobile accessible storage and executable by processing circuitry 110/210/410.

The hardware elements in order to achieve the processing circuitry 110/210/410 may be realized by specific circuitry elements. Further, each of the functions of the above described embodiments may be implemented by circuitry, which includes one or more processing circuits. A processing circuit includes a particularly programmed processor, for example, processor (CPU) 101, as shown in FIG. 3. A processing circuit also includes devices such as an ASIC and conventional circuit components arranged to perform the recited functions.

In FIG. 3, the processing circuitry 110/210/410 may be a general-purpose computer or a particular, special-purpose machine. In one embodiment, the processing circuitry 110 is programmed to execute processing to control teller device 100. Processing circuitry 210 is programmed to execute processing to control money device 200. Processing circuitry 410 is programmed to execute processing to control mobile device 400. In some implementations, the processing circuitry 110 of teller device 100, the processing circuitry 210 of money device 200 and the processing circuitry 410 of mobile device 400 may be communicable to bank cloud 300.

Alternatively, or additionally, the CPU 101 may be implemented on an FPGA, ASIC, PLD or using discrete logic circuits, as one of ordinary skill in the art would recognize. Further, CPU 101 may be implemented as multiple processors cooperatively working in parallel to perform the instructions of the inventive processes described above.

The processing circuitry 110/210/410 in FIG. 3 also includes a network controller 106, such as an Ethernet PRO network interface card, for interfacing with network 50. As can be appreciated, the network 50 can be a public network, such as the Internet, or a private network such as a local area network (LAN) or wide area network (WAN), or any combination thereof and can also include Public Switched Telephone Network (PSTN) or Integrated Services Digital Network (ISDN) sub-networks. The network 50 can also be wired, such as an Ethernet network, universal serial bus (USB) cable, or can be wireless such as a cellular network including EDGE, 3G and 4G wireless cellular systems. The wireless network can also be Wi-Fi, wireless LAN, Bluetooth, or any other wireless form of communication that is known. Additionally, network controller 106 may be compliant with other direct communication standards, such as Bluetooth, a near field communication (NFC), infrared ray or other.

The processing circuitry 110/210/410 may further include a display controller 108, such as a graphics card or graphics adaptor for interfacing with display 109, such as a monitor or touchscreen display. A general purpose I/O interface 112 interfaces with a keyboard and/or mouse 114 as well as a touch screen panel 116 on or separate from display 109. General purpose I/O interface also connects to a variety of peripherals 118 such as scanner 120. In an exemplary implementation, scanner 120 include a camera to scan the QR code for identifying money device 200.

The storage controller 124 connects the storage medium disk 104 with communication bus 126, which may be an ISA, EISA, VESA, PCI, or similar, for interconnecting all of the components of the processing circuitry 110/210/410. A description of the general features and functionality of the display 109, keyboard and/or mouse 114, as well as the display controller 108, storage controller 124, network controller 106, and general purpose I/O interface 112 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process.

Figure 4:
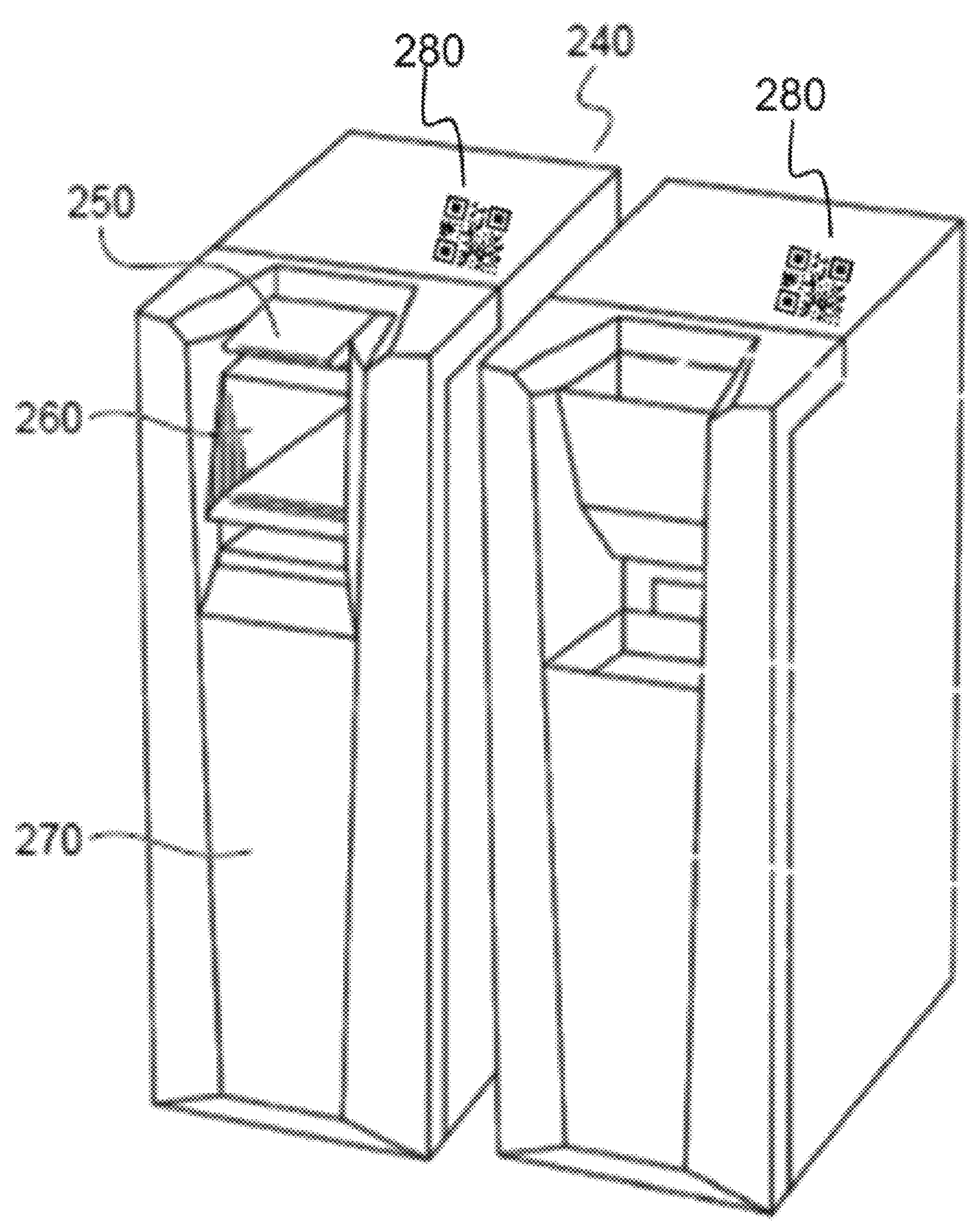
FIG. 4 is an external view of an exemplary money device in accordance with the present disclosure.

FIG. 4 is an external view of an exemplary money device 200 in accordance with the present disclosure. In particular, FIG. 4 is an external view of an example of the money device 200. The money device 200 shown in FIG. 4 includes money handling device 240.

The money handling device 240 has an inlet 250 from which money is deposited, and an outlet 260 from money is dispensed. In an exemplary implementation, the money deposited and/or dispensed is banknotes, but in other implementations, inlet 250 may receive coins for deposit and outlet 260 may dispense coins. In other implementations, a check or other form of deposit (other than banknotes and coins) may be deposited for transaction. The money handling device 240 has a cover 270 at a front surface thereof. The money handling device 240 may also perform the dispensing of currency to a customer. Upon completion of a transaction, the money handling device 240 may dispense currency via instruction from processing circuitry 210.

In an exemplary implementation, QR code 280 is affixed to money handling device 240. In other implementations, the QR code 280 is displayed via a display of money handling device 240, or is adjacent to or in proximity of money handling device 240 for identifying money handling device 240. The QR code 280 is scanned by teller device 100. QR code 280 may include identification information for teller device 100 to identify money device 200. After scanning of QR code 280, teller device 100 may initiate a pairing process with money device 200. After the scanning of QR code 280 and/or the pairing process to pair teller device 100 to money device 200, close proximity communication between teller device 100 and money device 200 is established and the transaction may be executed.

In another implementation, teller device 100 may scan QR code 280 and then teller device 100 may contact bank cloud 300 to verify money device 200. Device database 340 of bank cloud 300 may store device information about money device 200, and such information may be provided to teller device 100. Bank cloud 300 may then transmit pairing information to money device 200 to establish paring between teller device 100 to money device 200.

In another implementation, teller device 100 may scan QR code 280 and then teller device 100 may contact bank cloud 300 to provide information about money device 200 and initiate the transaction. Bank cloud 300 may then transmit transaction information to money device 200 to initiate and execute the transaction.

Figure 5:
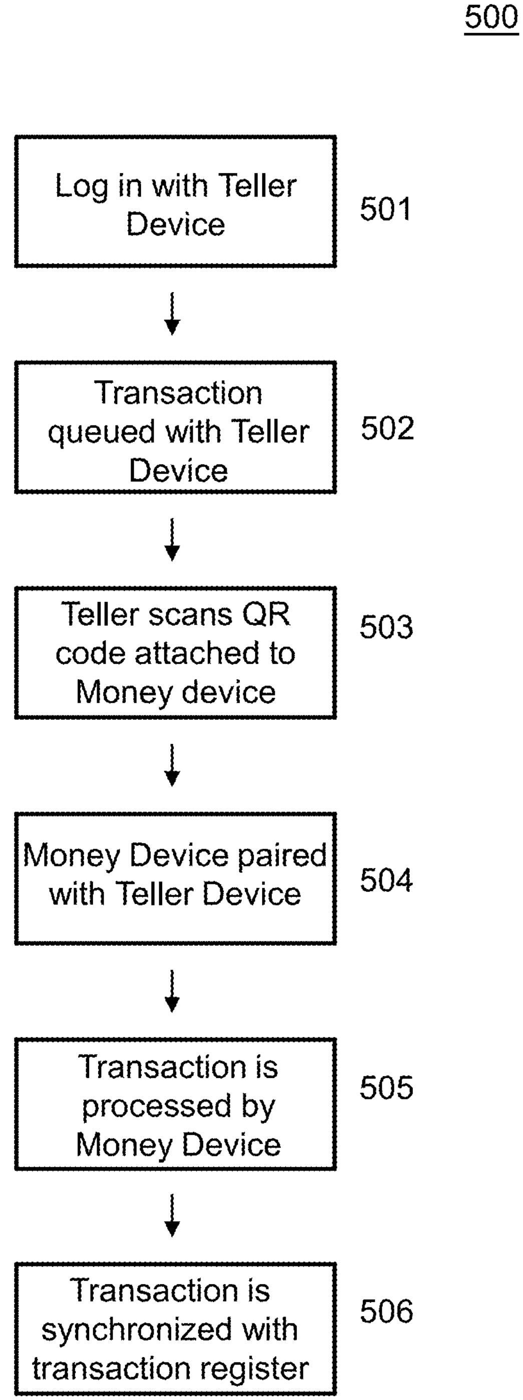
FIG. 5 illustrates an exemplary transaction process sequence in accordance with the present disclosure.

FIG. 5 illustrates an exemplary transaction process sequence 500 in accordance with the present disclosure.

In step 501, a teller may log in with teller device 100. The log in procedure may include the teller using teller device 100 to log into a banking application or banking website with the teller username and password. After the teller has successfully logged into the banking application or website, the process sequence continues to step 502.

In step 502, a transaction is queued with teller device 100. In an implementation, the teller device 100 transmits the transaction to terminal device 150 operating the CIA system. In another implementation in which the teller device 100 operates the CIA system, the teller device 100 processes the transaction in its own buffer.

To queue a transaction, the teller enters account and transaction information of the customer into teller device 100. For example, the teller may enter an account number of the customer along with details of their requested transaction (deposit amount, withdrawal amount, exchange amount, etc.).

In some implementations, customer information may be entered to authenticate an identity of the customer. Such customer information may be information that identifies the customer or the customer's account with the bank, such as a customer name, account number, member number, loyalty number, phone number, home address, email address, social security number, or other identifier. Security information to authenticate the customer's identity may also be provided, such as a password, PIN or other securely provided information to authenticate the user's identity. In other implementations, the customer may register by directly entering the customer information into teller device 100. Alternatively, the customer may use mobile device 400 to provide the customer information, account and transaction information to teller device 100. Additionally, mobile device 400 may be used to biometrically authenticate the customer and mobile device 400 may provide such authentication to teller device 100 via device to device communication, or via communication over network 50 or via bank cloud 300.

Additionally, a plurality of transactions may be queued at step 502. The teller may queue a plurality of transactions for the customer into teller device 100. Information regarding the plurality of transaction is stored in association with the information of the customer (e.g., account information and/or customer identity information).

In some implementations, the customer may use mobile device 400 to pre-register one or more transactions to be completed. Such pre-registration of transactions may be performed via an associated banking application or banking website on mobile device 400, and the pre-registered transactions may be stored on mobile device 400 or by bank server 310 or bank database 320 of bank cloud 300. The pre-registered transactions may be retrieved by teller device 100 from mobile device 400, or may be provided to teller device 100 from bank cloud 300.

In an exemplary implementation, teller device 100 provides an alert or notification if there is a problem with the transaction. For example, if the transaction involves a withdrawal, teller device 100 may output a visual and/or audio alert if the account associated with the transaction lacks funds needed for the withdrawal.

After the transaction (or plurality of transactions) are queued with teller device 100, the process sequence continues to step 503. In step 503, scanner 120 of teller device 100 scans QR code 280 of money device 200. After the QR code 280 is scanned, the process proceeds to step 504.

In step 504, the teller device 100 pairs with the money device 200. The pairing of teller device 100 and money device 200 is completed by the CIA system. For example, the teller device 100 may transmit transaction information and an ID of money device 200 to the terminal device 150 operating the CIA system. In another implementation in which the teller device 100 operates the CIA system, pairing of teller device 100 and money device 200 may be initiated directly via device to device communication by teller device 100 with money device 200, via network 50, or via bank cloud 300.

In another implementation, after scanning QR code 280, teller device 100 then communicates with bank cloud 300 with respect to an identification of money device 200. Bank cloud 300 may then transmit pairing instructions to teller device 100 and money device 200. In another implementation, transaction information may be provided by teller device 100 to bank cloud 300, and bank cloud 300 may provide transaction instructions to money device 200.

In an implementation, teller device 100 may provide an alert if the paired money device 200 is unable to perform the transaction. For example, if the money device 200 lacks the needed inventory for a withdrawal transaction, or if there is a physical problem such as a jam with the money device. The teller device 100 may display options for other money devices 200 which may process the transaction. If another money device 200 is selected, steps 503 and 504 may be repeated, the QR code 280 of another money device 200 is scanned and the pairing process is performed.

The pairing process of teller device 100 and money device 200 may include the matching of temporary codes. After teller device 100 scans the QR code 280 at step 503, and the teller device 100 may communicate with bank cloud 300 with respect to an identification of money device 200. Teller device 100 may then receive a temporary code from bank cloud 300 for display via a touchscreen display of teller device 100. Money device 200 may then receive the same temporary code from bank cloud 300 for display output by money device 200. The teller may then confirm whether the codes match, and if so, then teller device 100 may then proceed to pair teller device 100 and money device 200. For example, if the codes match then the teller may confirm the match by pressing a button on the touchscreen display of teller device 100, and then the pairing process is completed.

In step 505, money device 200 processes the queued transaction. In particular, the CIA system controls the money device 200 to process the queued transaction. If the transaction includes a deposit, then money (banknotes, coins, checks etc.) may be deposited via inlet 250. If the transaction includes a withdrawal, then money may be dispensed via outlet 260. If the transaction includes an exchange, then money to be exchanged may be deposited via inlet 250 and exchanged money may be dispensed via outlet 260. The transaction is not limited to deposit/withdrawal/exchange, and may further include other types of transactions, such as money transfer, vault buy, vault sell or others.

Step 505 may include processing plural queued transactions. The queued transactions may be performed in queued sequential order, in transaction priority order, or may be performed in a selected order. For example, the teller may select individual transactions from the transaction queue and the each selected transaction may be performed by money device 200. Transactions from the transaction queue may be selected for processing via teller device 200. In some embodiments, transactions from the transaction queue may be selected for processing via display output of the money device 200 or via mobile device 400.

In step 506, transactions processed by money device 200 are synchronized with transaction register 330. The synchronization of step 506 involves recording the performed transactions with transaction register 330 and the reconciling of performed transactions with account balances and money inventory of money device 200. The CIA system may perform the synchronization and reconciliation by providing transaction information to bank cloud 300. In another implementation, money device 200 provides transaction information of each transaction, along with inventory information of money device 200, to bank cloud 300 for synchronization and reconciliation. The synchronization of step 506 may be performed after each performed transaction or after mobile device 200 is unpaired from teller device 100. In some implementations, the synchronization may be performed each time that money device 200 is serviced for replenishment and recycling of deposited money, or the synchronization may be performed after a specified number of transactions, at preset times of day, or at a set period of time.

Figure 6:
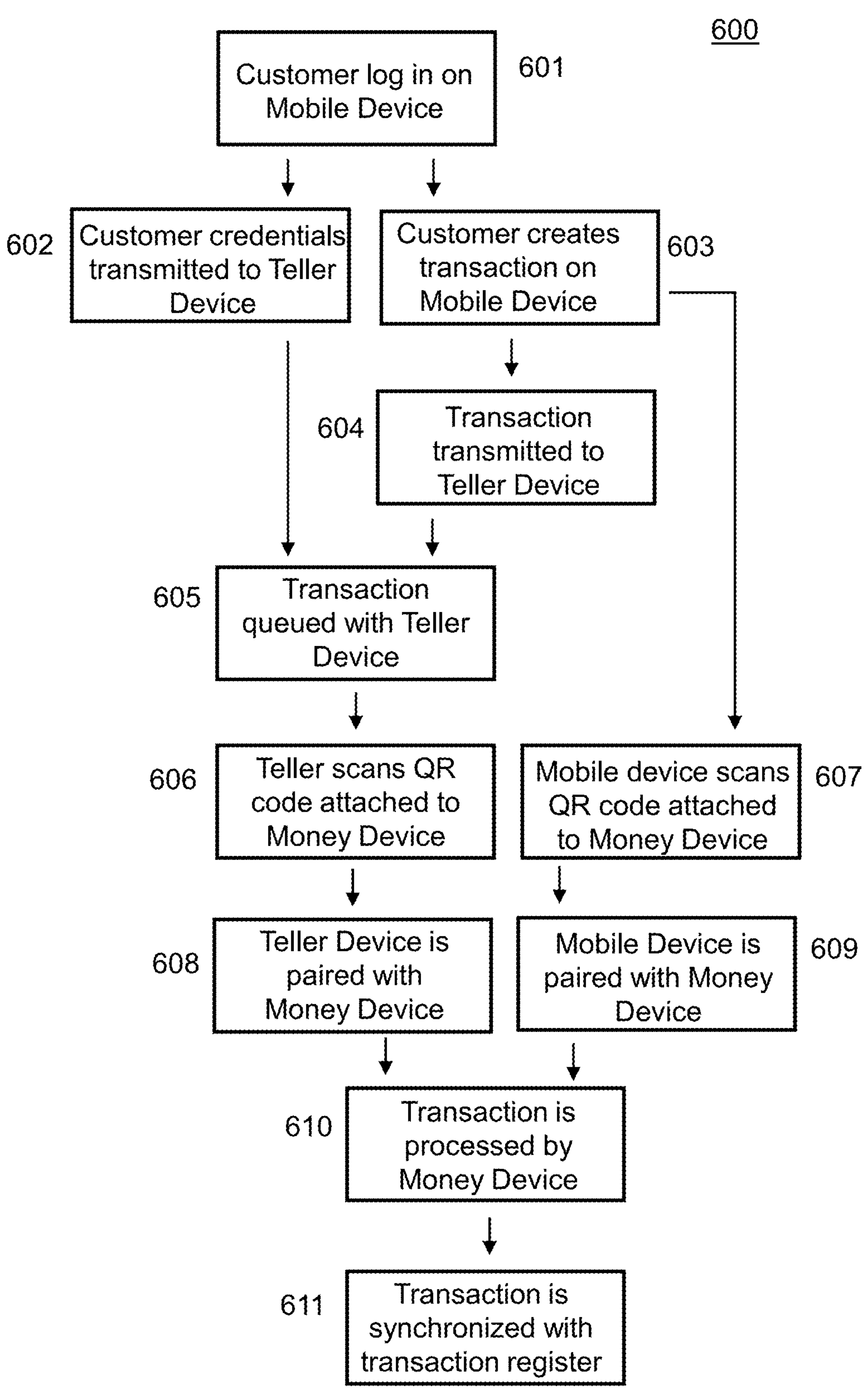
FIG. 6 illustrates an another exemplary transaction process sequence in accordance with the present disclosure.

FIG. 6 illustrates an another exemplary transaction process sequence 600 in accordance with the present disclosure.

In step 601, a customer may log in with mobile device 400. The log in procedure may include the customer logging into an associated banking application or website. The log in procedure may include the input of user name and password, or other account authentication information. As discussed above, the customer may log in with biometric authentication, which authenticates the customer with their fingerprint, face image, voice, or other biometric marker. The process sequence may then proceed to either step 602 or 603.

In step 602, customer credentials such as account information and an indication of identity authentication, are provided to teller device 100. The information may also be provided to terminal device 250 for use in the bank application. The information may be transmitted directly from mobile device 400 to teller device 100, directly from mobile device 400 to terminal device 150, via network 50 or may be provided by bank cloud 300 to teller device 100. Step 603 then proceeds to step 605.

In step 603, the customer may create a transaction on mobile device 400. One or more transactions may be created. After the one or more transactions are created, the proceed proceeds to either step 604 or 607.

In step 604, the one or more transactions created at step 603 are provided to teller device 100. The one or more transactions may be transmitted directly from mobile device 400 to teller device 100, via network 50 or may be provided by bank cloud 300 to teller device 100. Step 604 then proceeds to step 605.

In step 605, teller device 100 queues one or more transactions for execution. If one or more transactions have already been created/pre-registered by mobile device 400, then the teller device 100 queues one or more transactions for execution. If transactions have not yet been created, then transaction information, based on customer request, is input to teller device 100 and the one or more transactions are queued. In an implementation, the teller device 100 transmits the one or more transactions to terminal device 150 operating the CIA system. In another implementation in which the teller device 100 operates the CIA system, the teller device 100 processes the one or more transactions in its own buffer.

In step 606, scanner 120 of teller device 100 scans QR code 280 of money device 200. QR code 280 is unique to money device 200. Each money device 200 has its own unique QR code 280. In an implementation, device database 340 may store information regarding each money device 200 and its corresponding QR code 280.

After the QR code 280 is scanned, the teller device 100 proceeds to pair with the money device 200 at step 608 as discussed above with respect to step 504. In step 608, the teller device 100 pairs with the money device 200. The pairing of teller device 100 and money device 200 is completed by the CIA system. For example, the teller device 100 may transmit transaction information and an ID of money device 200 to the terminal device 150 operating the CIA system. In another implementation in which the teller device 100 operates the CIA system, pairing of teller device 100 and money device 200 may be initiated directly via device to device communication by teller device 100 with money device 200, via network 50, or via bank cloud 300.

In step 607, mobile device 400 scans QR code 280 of money device 200. After the QR code 280 is scanned, the mobile device 400 proceeds to pair with the money device 200 at step 608.

In step 609, the mobile device 400 may pair with the money device 200 via the CIA system. For example, the mobile device 400 communicates transaction information and an ID of money device 200 to the device operating the CIA system (terminal device 150 or teller device 100). In another implementation, the mobile device 400 may pair with the money device 200 directly via device to device communication with money device 200, via network 50, or via bank cloud 300. After scanning QR code 280, mobile device 400 then communicates with bank cloud 300 with respect to an identification of money device 200. Bank cloud 300 may then transmit pairing instructions to mobile device 400 and money device 200. In another implementation, transaction information may be provided by mobile device 400 to bank cloud 300, and bank cloud 300 may provide transaction instructions to money device 200.

In another implementation, the pairing process of mobile device 400 and money device 200 may include the matching of temporary codes as discussed above with respect to step 504. After mobile device 400 scans the QR code 280, the mobile device 400 may communicate with bank cloud 300 with respect to an identification of money device 200. Mobile device 400 may then receive a temporary code from bank cloud 300 for display via a touchscreen display of mobile device 400. Money device 200 may then receive the same temporary code from bank cloud 300 for display output by money device 200. The customer may then confirm whether the codes match, and if so, then mobile device 400 may then proceed to pair mobile device 400 and money device 200.

In step 610, money device 200 processes the queued transaction(s) as discussed above with respect to step 505. In step 611, transactions processed by money device 200 are synchronized and reconciled as discussed above with respect to step 506.

Figure 7A:
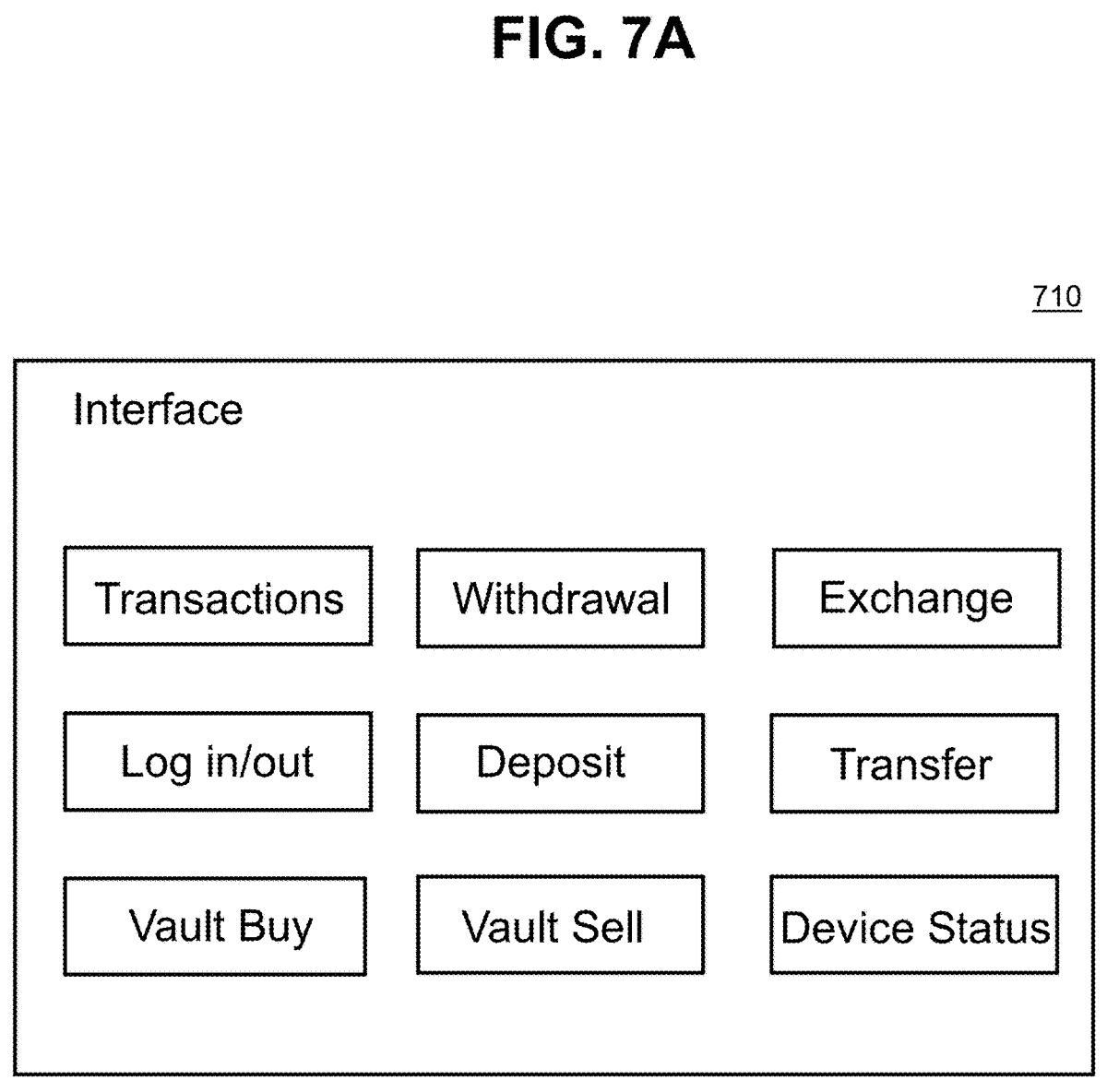

FIG. 7A illustrates a block diagram of an exemplary display interface screen 710 of a teller device 100 in accordance with the present disclosure. The display interface screen 710 includes a variety of transaction processes which may be performed, including list of transaction history, withdrawal, exchange, log in/out, deposit, transfer, vault buy, vault sell, and check device status. The teller may select a particular process from display interface screen 710 and then teller device 100 proceeds to initiate the selected process. In an exemplary implementation, the display interface screen 710 is displayed on teller device 100 after the teller logs in and while the teller interacts with the customer to create and initiate a transaction.

Display interface screen 710 may be displayed by mobile device 400 of the customer. For example, after the customer has logged in/authenticated themselves with the banking application and/or bank website, display interface screen 710 may be displayed for use and by interaction with the customer.

FIG. 7B illustrates a block diagram of an exemplary money device selection screen 720 of the teller device 100 in accordance with the present disclosure.

The money device selection screen 720 provides options to check a status of one or more money devices 200 as well as an option to select a particular money device 200 with which to execute a transaction. In an implementation, the teller selects a particular money device 200 from money device selection screen 720 and then proceeds to scan QR code 280 on the particular money device 200 to then initiate pairing of teller device 100 and the particular money device 200.

The teller may also select a particular money device 200 and check its status or may select the money device 200 to execute the transaction. In an implementation, a device status option may be selected from display interface screen 710 which then initiates the output of money device selection screen 720.

Money device selection screen 720 may be displayed by mobile device 400 of the customer. For example, after the customer has logged in/authenticated themselves with the banking application and/or bank website, money device selection screen 720 may be displayed for use and by interaction with the customer. The customer, with mobile device 400, may check a status of one or more money devices 200 and the customer may select a particular money device 200 with which to execute a transaction.

Figure 7C:
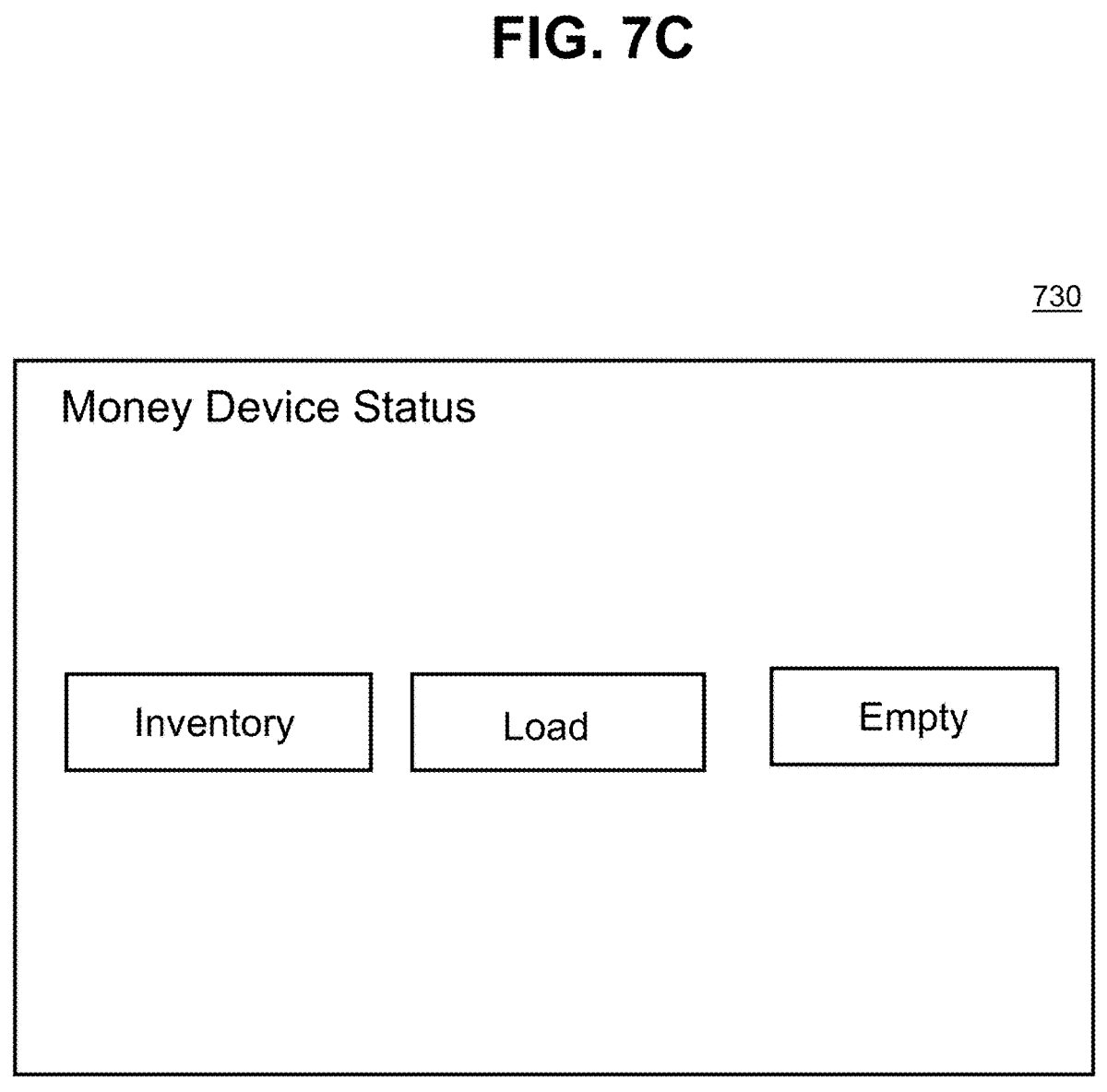

FIG. 7C illustrates a block diagram of an exemplary money device status screen 730 of the teller device 100 in accordance with the present disclosure. Money device status screen 730 includes options to check on inventory of money device 200, as well as options to initiate a loading or emptying process of money device 200. When an inventory option is selected, teller device 100 may output information indicating a current inventory of money device 200. When a load option is selected, the teller may select amounts of money to be loaded into money device 200. When an empty option is selected, the teller may initiate a process to empty and/or recycle money stored in money device 200. Alternatively, when a load option or empty option is selected, the teller may initiate an order instruction for the money device 200 to be loaded with money or unloaded of deposited money. In an implementation, money device status screen 730 may be initiated by selection of a particular money device from money device selection screen 720.

FIG. 7D illustrates a block diagram of an exemplary money device transaction history screen 740 of the teller device 100 in accordance with the present disclosure. In an implementation, a transactions option may be selected from display interface screen 710 which then initiates the output of money device transaction history screen 740. Money device transaction history screen 740 includes a list of transactions performed by money device 200. Each transaction may be selected for further details. A remaining balance in money device 200 may be shown with respect to each transaction.

Device transaction history screen 740 may be displayed by mobile device 400 of the customer. However, the device transaction history screen 740, when displayed by mobile device 400, may only display transactions of the customer, and may not include transactions of other customers performed by money device 200.

FIG. 7E illustrates a block diagram of an exemplary deposit screen 750 of the teller device 100 in accordance with the present disclosure. In an implementation, a deposit option may be selected from display interface screen 710 which then initiates the output of deposit screen 750. Deposit screen 750 includes information indicating denomination and count of each denomination for the deposit. The teller may edit the count of each denomination via teller device 100. A total deposit amount is displayed.

In some embodiments, money may be deposited with coins, check or other form or denomination. Such deposits may be indicated on deposit screen 750.

Deposit screen 750 may be displayed by mobile device 400 of the customer. For example, after the customer has logged in/authenticated themselves with the banking application and/or bank website, deposit screen 750 may be displayed for use and by interaction with the customer.

FIG. 7F illustrates a block diagram of an exemplary withdrawal screen 760 of the teller device 100 in accordance with the present disclosure. In an implementation, a withdrawal option may be selected from display interface screen 710 which then initiates the output of withdrawal screen 760. Withdrawal screen 760 includes information indicating denomination and count of each denomination for the withdrawal. The teller may edit the count of each denomination via teller device 100. A total withdrawal amount is displayed.

In some embodiments, money may be dispensed with coins or other form or denomination. For example, a pre-paid card, credit amount or other item indicating a value may be dispensed (i.e., pre-paid card with a particular value, gift card, etc.). Such withdrawals may be indicated on deposit screen 760.

Withdrawal screen 760 may be displayed by mobile device 400 of the customer. For example, after the customer has logged in/authenticated themselves with the banking application and/or bank website, withdrawal screen 760 may be displayed for use and by interaction with the customer.

FIG. 7G illustrates a block diagram of an exemplary exchange screen 770 of the teller device 100 in accordance with the present disclosure. In an implementation, an exchange option may be selected from display interface screen 710 which then initiates the output of exchange screen 770. Exchange screen 770 includes information indicating denomination and count of each denomination for withdrawal and count of each denomination for deposit. The teller may edit the count of each denomination via teller device 100. A total deposited amount and a total dispensed amount are displayed.

In some embodiments, money may be deposited with coins, check or other form or denomination. And coins or other forms of denomination may be dispensed. For example, a pre-paid card, credit amount or other item indicating a value may be dispensed (i.e., pre-paid card with a particular value, gift card, etc.). Such withdrawals may be indicated on deposit screen 760. Such deposits and withdrawals may be indicated on deposit screen 750.

Exchange screen 770 may be displayed by mobile device 400 of the customer. For example, after the customer has logged in/authenticated themselves with the banking application and/or bank website, exchange screen 770 may be displayed for use and by interaction with the customer.

Features of the present disclosure may be performed by teller device 100 and money device 200 without an active connection to bank cloud 300. That is, teller device 100 and money device 200 may operate "offline", alongside and not reliant upon a bank's core system such as bank cloud 300. Later, teller device 100 and money device 200 may communicate with bank cloud 300 for transaction synchronization and reconciliation. Such features provide functionality that is complementary to current banking core system functionality and allows for simple integration into existing systems and structures. Thus, transactions and activities that may not yield a business benefit of full integration, such as reporting or highly device focused activities such as empty, load and audit, may be performed with low risk.

Moreover, features of the present disclosure enable a deployment model for TCRs, allowing bank/credit union staff members to be more mobile in a branch and not be restricted to a static teller position. The present disclosure includes processes which ensure that transactions are not completed at a TCR unless the staff member driving the transaction is physically next to the TCR. By implementing QR code scanning, the bank/credit union staff member physically scans the QR code with her/his tablet ensuring their proximity and to enable the transaction to be completed. This solution could help our customers offer their customers a better level of service and optimize cost structure.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the disclosure to produce additional embodiments. Furthermore, certain features may sometimes be used to advantage without a corresponding use of other features. Accordingly, Applicant (s) intend(s) to embrace all such alternatives, modifications, equivalents, and variations that are within the spirit and scope of the disclosed subject matter.

What is claimed is:

1. A transaction system, comprising:
- a money device including a body having a quick response (QR) code affixed to the body; and
- a teller device including a scanner and processing circuitry, the processing circuitry configured to:
  - queue a transaction with respect to an account;
  - control the scanner to scan the QR code of the money device;
  - pair the teller device and the money device;
  - send the queued transaction to the money device after the teller device and the money device are paired; and
  - instruct the money device to process the transaction after the processing circuitry sends the queued transaction to the money device.

2. The transaction system according to claim 1, wherein the transaction includes a deposit, and
- the money device includes an inlet for deposit of money.

3. The transaction system according to claim 1, wherein the transaction includes a withdrawal, and
- the money device includes an output for the dispense of money.

4. The transaction system according to claim 1, wherein the teller device is a mobile device including a touchscreen display.

5. The transaction system according to claim 4, wherein the teller device is a tablet device.

6. The transaction system according to claim 1, wherein the money device includes a teller cash recycler (TCR).

7. The transaction system according to claim 1, wherein the processing circuitry is configured to pair with the money device by communicating with a transaction management application system.

8. The transaction system according to claim 1, wherein the processing circuitry is configured to pair with the money device via wireless communication over a network.

9. The transaction system according to claim 1, wherein the processing circuitry is further configured to:
- communicate, via a network, an identifier of the money device to a central bank system;
- receive, from the central bank systems, an instruction to pair with the money device; and
- pair the teller device and the money device in accordance with the instruction.

10. The transaction system according to claim 1, wherein the processing circuitry is further configured to receive user input to generate the transaction.

11. The transaction system according to claim 1, wherein the processing circuitry is further configured to communicate with a mobile device.

12. The transaction system according to claim 11, wherein the processing circuitry is further configured to receive information regarding the account from the mobile device.

13. The transaction system according to claim 11, wherein the processing circuitry is further configured to receive authentication information of a user of the mobile device.

14. The transaction system according to claim 11, wherein the transaction is generated by the mobile device, and
- the processing circuitry is further configured to receive information regarding the transaction from the mobile device.

15. A teller device, comprising:
- processing circuitry configured to:
- generate a transaction with respect to an account;
- control a scanner to scan a quick response (OR) code affixed to a money device;
- pair the teller device and the money device;
- send the queued transaction to the money device after the teller device and the money device are paired; and
- instruct the money device to process the transaction after the processing circuitry sends the queued transaction to the money device.

16. The teller device according to claim 15, further comprising a touchscreen display.

17. The teller device according to claim 15, wherein the processing circuitry is configured to pair with the money device by communicating with a transaction management application system.

18. The teller device according to claim 15, wherein the processing circuitry is configured to pair with the money device via wireless communication over a network.

19. The teller device according to claim 15, wherein the processing circuitry is further configured to;

communicate, via a network, an identifier of the money device to a central bank system;

receive, from the central bank systems, an instruction to pair with the money device; and pair the teller device and the money device in accordance with the instruction.

20. A transaction method, comprising:

generating, by a first device including processing circuitry, a transaction with respect to an account;

scanning, by the first device, a quick response (OR) code affixed to a second device;

pairing the first device with the second device;

sending the queued transaction to the money device after the teller device and the money device are paired; and instructing, by the first device, the second device to process the transaction after the sending of the queued transaction to the money device.

* * * * *